United States Patent
Kim et al.

(10) Patent No.: US 10,711,321 B2
(45) Date of Patent: Jul. 14, 2020

(54) ADHESIVE COATING COMPOSITION FOR NON-ORIENTED ELECTRICAL STEEL SHEET, NON-ORIENTED ELECTRICAL STEEL SHEET PRODUCT, AND MANUFACTURING METHOD THEREFOR

(71) Applicant: POSCO, Pohang-Si, Gyeongsangbuk-Do (KR)

(72) Inventors: Jung Woo Kim, Pohang-si (KR); Ji Hyun Kim, Pohang-si (KR); Jae Song Kim, Pohang-si (KR); Jae Hoon Kim, Pohang-si (KR)

(73) Assignee: POSCO, Pohang-si, Gyeongsangbuk-do (KR)

(*) Notice: Subject to any disclaimer, the term of this patent is extended or adjusted under 35 U.S.C. 154(b) by 113 days.

(21) Appl. No.: 16/065,018

(22) PCT Filed: Jul. 27, 2016

(86) PCT No.: PCT/KR2016/008240
§ 371 (c)(1),
(2) Date: Jun. 21, 2018

(87) PCT Pub. No.: WO2017/111244
PCT Pub. Date: Jun. 29, 2017

(65) Prior Publication Data
US 2019/0010567 A1   Jan. 10, 2019

(30) Foreign Application Priority Data

Dec. 21, 2015   (KR) .................. 10-2015-0183226

(51) Int. Cl.
*B32B 3/00*   (2006.01)
*C21D 8/12*   (2006.01)
(Continued)

(52) U.S. Cl.
CPC .............. *C21D 8/1277* (2013.01); *B32B 7/12* (2013.01); *B32B 15/04* (2013.01); *C08G 83/001* (2013.01);
(Continued)

(58) Field of Classification Search
CPC ......... B32B 7/12; B32B 15/04; C21D 8/1283; C21D 8/1277; C09D 7/67; C09D 201/02;
(Continued)

(56) References Cited

U.S. PATENT DOCUMENTS 7,976,902 B2 * 7/2011 Han .................. C09D 5/084
427/372.2
2009/0324837 A1  12/2009 Han et al.
(Continued)

FOREIGN PATENT DOCUMENTS

CN  102007227 A   4/2011
CN  104025207 A   9/2014
(Continued)

OTHER PUBLICATIONS

Japanese Office Action dated Jun. 25, 2019 issued in Japanese Patent Application No. 2018-532600.
(Continued)

*Primary Examiner* — Elizabeth E Mulvaney
(74) *Attorney, Agent, or Firm* — Morgan, Lewis & Bockius LLP

(57) ABSTRACT

The present invention relates to a non-oriented electrical steel sheet adhesive coating composition including the constituent elements below, a non-oriented electrical steel sheet product, and a manufacturing method thereof. The non-oriented electrical steel sheet adhesive coating composition includes: a first component including an organic/inorganic composite; and a second component including a composite metal phosphate, wherein the organic/inorganic composite is
(Continued)

formed by having inorganic nanoparticles chemically substituted with some functional groups in an organic resin, the organic resin is one, or two or more, selected from an epoxy-based resin, an ester-based resin, an acrylic resin, a styrene-based resin, a urethane-based resin, and an ethylene-based resin, and the inorganic nanoparticles are one, or two or more, selected from $SiO_2$, $Al_2O_3$, $TiO_2$, MgO, ZnO, and $ZrO_2$.

20 Claims, 5 Drawing Sheets

(51) Int. Cl.
<table><tr><td>C09J 11/04</td><td>(2006.01)</td></tr><tr><td>C08K 3/22</td><td>(2006.01)</td></tr><tr><td>C08K 3/32</td><td>(2006.01)</td></tr><tr><td>C21D 1/30</td><td>(2006.01)</td></tr><tr><td>B32B 15/04</td><td>(2006.01)</td></tr><tr><td>B32B 7/12</td><td>(2006.01)</td></tr><tr><td>C09J 201/00</td><td>(2006.01)</td></tr><tr><td>C09D 201/02</td><td>(2006.01)</td></tr><tr><td>C09D 7/40</td><td>(2018.01)</td></tr><tr><td>C22C 38/02</td><td>(2006.01)</td></tr><tr><td>C22C 38/00</td><td>(2006.01)</td></tr><tr><td>C22C 38/60</td><td>(2006.01)</td></tr><tr><td>C22C 38/06</td><td>(2006.01)</td></tr><tr><td>C22C 38/04</td><td>(2006.01)</td></tr><tr><td>C08G 83/00</td><td>(2006.01)</td></tr><tr><td>C09J 201/02</td><td>(2006.01)</td></tr><tr><td>C08K 9/08</td><td>(2006.01)</td></tr></table>

(52) U.S. Cl.
CPC .................. *C08K 3/22* (2013.01); *C08K 3/32* (2013.01); *C09D 7/67* (2018.01); *C09D 201/02* (2013.01); *C09J 11/04* (2013.01); *C09J 201/00* (2013.01); *C09J 201/02* (2013.01); *C21D 1/30* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/60* (2013.01); *B05D 2202/10* (2013.01); *C08K 9/08* (2013.01); *C08K 2003/2227* (2013.01); *C08K 2003/2241* (2013.01); *C08K 2003/2244* (2013.01); *C08K 2003/2296* (2013.01); *C08K 2003/325* (2013.01); *C08K 2003/326* (2013.01); *C08K 2003/327* (2013.01); *C08K 2003/328* (2013.01); *C08K 2201/005* (2013.01)

(58) Field of Classification Search
CPC .... C08K 3/22; C08K 3/32; C09J 11/04; C09J 201/00; C09J 201/02; C22C 38/02; C22C 38/04; C22C 38/06; C22C 38/60
See application file for complete search history.

(56) References Cited

U.S. PATENT DOCUMENTS

<table><tr><td>2011/0039120 A1*</td><td>2/2011</td><td>Fujii</td><td>C04B 28/34<br>428/577</td></tr><tr><td>2015/0017428 A1</td><td>1/2015</td><td>Kim et al.</td><td></td></tr><tr><td>2016/0375658 A1</td><td>12/2016</td><td>Kim et al.</td><td></td></tr></table>

FOREIGN PATENT DOCUMENTS

<table><tr><td>EP</td><td>2800103 A1</td><td>11/2014</td></tr><tr><td>EP</td><td>3075882 A1</td><td>10/2016</td></tr><tr><td>JP</td><td>H07-041913 A</td><td>2/1995</td></tr><tr><td>JP</td><td>2006-054244 A</td><td>2/2006</td></tr><tr><td>JP</td><td>2009-545674 A</td><td>12/2009</td></tr><tr><td>JP</td><td>2013-249486</td><td>12/2013</td></tr><tr><td>JP</td><td>2015-509994 A</td><td>4/2015</td></tr><tr><td>JP</td><td>2016-540901 A</td><td>12/2016</td></tr><tr><td>KR</td><td>10-2007-0042198 A</td><td>4/2007</td></tr><tr><td>KR</td><td>10-2008-0033999 A</td><td>4/2008</td></tr><tr><td>KR</td><td>10-2013-0001535 A</td><td>1/2013</td></tr><tr><td>KR</td><td>10-2014-0060716 A</td><td>5/2014</td></tr><tr><td>KR</td><td>10-2014-0060717 A</td><td>5/2014</td></tr><tr><td>KR</td><td>10-2014-0062535 A</td><td>5/2014</td></tr><tr><td>KR</td><td>10-2014-0063447 A</td><td>5/2014</td></tr><tr><td>KR</td><td>10-2015-0061472 A</td><td>6/2015</td></tr><tr><td>KR</td><td>10-2015-0074817 A</td><td>7/2015</td></tr><tr><td>WO</td><td>2008/016220 A1</td><td>2/2008</td></tr></table>

OTHER PUBLICATIONS

Extended European Search Report dated Sep. 17, 2018 issued in European Patent Application No. 16879112.7.
Chinese Office Action dated May 21, 2019 issued in Chinese Patent Application No. 201680075347.X.
Written Opinion and International Search Report dated Jan. 2, 2017 issued in International Patent Application No. PCT/KR2016/008240 (with English translation).

* cited by examiner

After Stress Relief Annealing (Modifying Gas)

ADHESIVE COATING COMPOSITION FOR NON-ORIENTED ELECTRICAL STEEL SHEET, NON-ORIENTED ELECTRICAL STEEL SHEET PRODUCT, AND MANUFACTURING METHOD THEREFOR

CROSS REFERENCE

This patent application is the U.S. National Phase under 35 U.S.C. § 371 of International Application No. PCT/KR2016/008240, filed on Jul. 27, 2016, which claims the benefit of Korean Patent Application No. 10-2015-0183226, filed on Dec. 21, 2015, the entire contents of each are hereby incorporated by reference.

TECHNICAL FIELD

A non-oriented electrical steel sheet adhesive coating composition, a non-oriented electrical steel sheet product, and a manufacturing method thereof are disclosed.

BACKGROUND ART

A non-oriented electrical steel sheet is a steel sheet of which a magnetic property thereof is uniform in all directions on a rolling plate, and a product thereof is widely used in a motor, an iron core of an electric generator, an electric motor, a small transformer, and the like.

Specifically, the non-oriented electrical steel sheet product may be manufactured by laminating a plurality of non-oriented electrical steel sheets. Herein, an adhesive coating composition is used to adhere different non-oriented electrical steel sheets or coat any one surface thereof.

The adhesive coating composition is basically used for a main purpose of interlayer insulation and adhesion of the different non-oriented electrical steel sheets, and in general, excellent insulation properties are secured by increasing a thickness of an adhesive coating layer.

However, when a thickness of the adhesive coating layer is increased, there are disadvantages that properties such as weldability, heat resistance, close-contacting properties before/after SRA, a stacking factor, and the like, are deteriorated.

DISCLOSURE

Technical Problem

Embodiments of the present invention have been made in an effort to provide a non-oriented electrical steel sheet adhesive coating composition capable of solving the above-described problems, a non-oriented electrical steel sheet product including the applied adhesive coating composition, and a method of manufacturing the product.

Technical Solution

Non-Oriented Electrical Steel Sheet Adhesive Coating Composition

In an embodiment of the present invention, a non-oriented electrical steel sheet adhesive coating composition includes: a first component including an organic/inorganic composite; and a second component including a composite metal phosphate, the composition includes 70 to 99 wt % of the first component and 1 to 30 wt % of the second component based on a total amount, 100 wt %, of the composition, the organic/inorganic composite is formed by having inorganic nanoparticles chemically substituted with some functional groups in an organic resin, the organic resin is one, or two or more, selected from an epoxy-based resin, an ester-based resin, an acrylic resin, a styrene-based resin, a urethane-based resin, and an ethylene-based resin, and the inorganic nanoparticles are one, or two or more, selected from $SiO_2$, $Al_2O_3$, $TiO_2$, MgO, ZnO, and $ZrO_2$.

Specifically, the first component and the second component are as follows.

The second component may be one composite metal phosphate or a mixture of two or more selected from aluminum phosphate monobasic ($Al(H_3PO_4)_3$), cobalt phosphate monobasic ($Co(H_3PO_4)_2$), calcium phosphate monobasic ($Ca(H_3PO_4)_2$), zinc phosphate monobasic ($Zn(H_3PO_4)_2$), and magnesium phosphate monobasic ($Mg(H_3PO_4)_2$).

More specifically, when the second component is a mixture, it may be selected from a mixture of the aluminum phosphate monobasic ($Al(H_3PO_4)_3$) and the cobalt phosphate monobasic ($Co(H_3PO_4)_2$) in a weight ratio of 1:1, a mixture of the cobalt phosphate monobasic ($Co(H_3PO_4)_2$) and the zinc phosphate monobasic ($Zn(H_3PO_4)_2$) in a weight ratio of 1:1, a mixture of the aluminum phosphate monobasic ($Al(H_3PO_4)_3$) and the magnesium phosphate monobasic ($Mg(H_3PO_4)_2$) in a weight ratio of 1:1, a mixture of the cobalt phosphate monobasic ($Co(H_3PO_4)_2$) and the calcium phosphate monobasic ($Ca(H_3PO_4)_2$) in a weight ratio of 1:1, a mixture of the calcium phosphate monobasic ($Ca(H_3PO_4)_2$) and the zinc phosphate monobasic ($Zn(H_3PO_4)_2$) in a weight ratio of 1:1, a mixture of the aluminum phosphate monobasic ($Al(H_3PO_4)_3$), the cobalt phosphate monobasic ($Co(H_3PO_4)_2$), and the calcium phosphate monobasic ($Ca(H_3PO_4)_2$) in a weight ratio of 1:1:1, and a mixture of the aluminum phosphate monobasic ($Al(H_3PO_4)_3$), the calcium phosphate monobasic ($Ca(H_3PO_4)_2$), and the magnesium phosphate monobasic ($Mg(H_3PO_4)_2$) in a weight ratio of 1:1:1.

In addition, the first component may be one organic/inorganic composite or a mixture of two or more selected from a $SiO_2$-epoxy composite, an $Al_2O_3$-epoxy composite, a $TiO_2$-epoxy composite, a $SiO_2$-ester composite, a ZnO-ester composite, a $SiO_2$-acrylic composite, an $Al_2O_3$-acrylic composite, a ZnO-acrylic composite, a $ZrO_2$-acrylic composite, a $SiO_2$-styrene composite, a $TiO_2$-styrene composite, a MgO-styrene composite, a $SiO_2$-urethane composite, an $Al_2O_3$-urethane composite, a ZnO-urethane composite, a $SiO_2$-ethylene composite, an $Al_2O_3$-ethylene composite, and a ZnO-ethylene composite.

More specifically, when the first component is a mixture, it may be selected from a mixture of the $SiO_2$-epoxy composite and the $Al_2O_3$-epoxy composite in a weight ratio of 1:1, a mixture of the $SiO_2$-epoxy composite and the $TiO_2$-epoxy composite in a weight ratio of 1:1, a mixture of the $SiO_2$-ester composite and the ZnO-ester composite in a weight ratio of 1:1, a mixture of the $SiO_2$-styrene composite and the MgO-styrene composite in a weight ratio of 1:1, a mixture of the $SiO_2$-styrene composite and the $TiO_2$-styrene composite in a weight ratio of 1:1, a mixture of the $Al_2O_3$-urethane composite and the ZnO-urethane composite in a weight ratio of 1:1, a mixture of the $SiO_2$-urethane composite and the ZnO-urethane composite in a weight ratio of 1:1, a mixture of the $SiO_2$-ethylene composite and the $Al_2O_3$-ethylene composite in a weight ratio of 1:1, a mixture of the $SiO_2$-ethylene composite and the ZnO-ethylene composite in a weight ratio of 1:1, a mixture of the $SiO_2$-epoxy, the $Al_2O_3$-epoxy, and the $TiO_2$-epoxy composite in a weight ratio of 1:1:1, a mixture of the $SiO_2$-acrylic composite, the $Al_2O_3$-acrylic composite, and the ZnO-acrylic composite in a weight ratio of 1:1:1, a mixture of the $SiO_2$-styrene composite, the $TiO_2$-styrene composite, and the MgO-styrene composite in a weight ratio of 1:1:1, a mixture of the $SiO_2$-urethane composite, the $Al_2O_3$-urethane composite, and the ZnO-urethane composite in a weight ratio of 1:1:1, and a mixture of the $SiO_2$-ethylene composite, the $Al_2O_3$-ethylene composite, and the ZnO-ethylene composite in a weight ratio of 1:1:1.

More specifically, constituting materials of the first component are as follows.

The organic resin may be included in an amount of 70 to 99.9 wt % based on 100 wt % of the first component.

In addition, the inorganic nanoparticles may be included in an amount of 0.1 to 30 parts by weight based on 100 parts by weight of a solid content of the organic resin.

A weight ratio of the inorganic nanoparticles relative to the metal phosphate may be 0.01:1 to 0.2:1.

The organic resin may have a number average molecular weight of 1000 to 40,000 and a weight average molecular weight of 1000 to 50,000.

In addition, the organic resin may have a softening point (Tg) of less than or equal to 200° C.

The inorganic nanoparticles may have an average particle diameter of 3 to 30 nm.

Non-Oriented Electrical Steel Sheet Product

In another embodiment of the present invention, a non-oriented electrical steel sheet product includes: a plurality of non-oriented electrical steel sheets; and an adhesive coating layer between the plurality of non-oriented electrical steel sheets;

the adhesive coating layer includes a first component including an organic/inorganic composite and a second component including a composite metal phosphate, the adhesive coating layer includes 70 to 99 wt % of the first component and 1 to 30 wt % of the second component based on a total amount, 100 wt %, of the adhesive coating layer, the organic/inorganic composite is formed by having inorganic nanoparticles chemically substituted with some functional groups in an organic resin, the organic resin is one, or two or more, selected from an epoxy-based resin, an ester-based resin, an acrylic resin, a styrene-based resin, a urethane-based resin, and an ethylene-based resin, and the inorganic nanoparticles are one, or two or more, selected from $SiO_2$, $Al_2O_3$, $TiO_2$, MgO, ZnO, and $ZrO_2$.

The second component is as follows, and other constituting materials of the adhesive coating layer are the same as described above.

The second component may be one composite metal phosphate or a mixture of two or more selected from aluminum phosphate monobasic ($Al(H_3PO_4)_3$), cobalt phosphate monobasic ($Co(H_3PO_4)_2$), calcium phosphate monobasic ($Ca(H_3PO_4)_2$), zinc phosphate monobasic ($Zn(H_3PO_4)_2$), and magnesium phosphate monobasic ($Mg(H_3PO_4)_2$).

The inorganic nanoparticles may be uniformly distributed in the adhesive coating layer.

Specifically, the inorganic nanoparticles may be distributed in 1 to 10 area % based on a total area, 100 area %, of the adhesive coating layer.

The adhesive coating layer may have a thickness of 0.5 to 10 μm.

Method of Manufacturing Non-Oriented Electrical Steel Sheet Product

In another embodiment of the present invention, a method of manufacturing a non-oriented electrical steel sheet product includes:

preparing an adhesive coating composition; adhering a plurality of non-oriented electrical steel sheets with the adhesive coating composition; and stress-relief annealing (SRA) a plurality of non-oriented electrical steel sheets adhered thereto with the adhesive coating composition to obtain a non-oriented electrical steel sheet product, the adhesive coating composition is a composition including a first component including an organic/inorganic composite and a second component including a composite metal phosphate, the composition includes 70 to 99 wt % of the first component and 1 to 30 wt % of the second component based on a total amount, 100 wt %, of the composition, the organic/inorganic composite is formed by having inorganic nanoparticles chemically substituted with some functional groups in an organic resin, the organic resin is one, or two or more, selected from an epoxy-based resin, an ester-based resin, an acrylic resin, a styrene-based resin, a urethane-based resin, and an ethylene-based resin, and the inorganic nanoparticles are one, or two or more, selected from $SiO_2$, $Al_2O_3$, $TiO_2$, MgO, ZnO, and $ZrO_2$.

Specifically, the adhering of a plurality of non-oriented electrical steel sheets with the adhesive coating composition may include: applying the adhesive coating composition on one surface or both surfaces of the plurality of non-oriented electrical steel sheets; curing the applied adhesive coating composition to form an adhesive coating layer; and laminating another sheet of the plurality of non-oriented electrical steel sheets on the adhesive coating layer and performing heat fusion.

Herein, the curing of the applied adhesive coating composition to form an adhesive coating layer may be performed in a temperature range of 200 to 600° C. for 5 to 40 seconds.

In addition, the laminating of another sheet of the plurality of non-oriented electrical steel sheets on the adhesive coating layer and performing heat fusion may be performed in a temperature range of 100 to 300° C. and in a pressure range of 0.01 to 5 MPa, for 6 seconds to 180 minutes.

Meanwhile, the stress-relief annealing (SRA) of a plurality of non-oriented electrical steel sheets adhered thereto with the adhesive coating composition to obtain a non-oriented electrical steel sheet product may be performed in a temperature range of 500 to 900° C. for 60 to 180 minutes under a mixed gas atmosphere of a modifying gas and nitrogen ($N_2$) gas.

Specifically, the nitrogen gas may be included at 90 volume % or greater (excluding 100 volume %) based on 100 volume % of the mixed gas.

More specifically, the modifying gas may include a mixed gas of air and LNG.

Advantageous Effects

According to embodiments of the present invention, properties such as weldability, heat resistance, close-contacting properties before/after SRA, stacking factor, and the like may be improved while exhibiting excellent adhesion force and insulation properties even if the adhesive coating layer is formed in a thin thickness.

MODE FOR INVENTION

Figure 1:
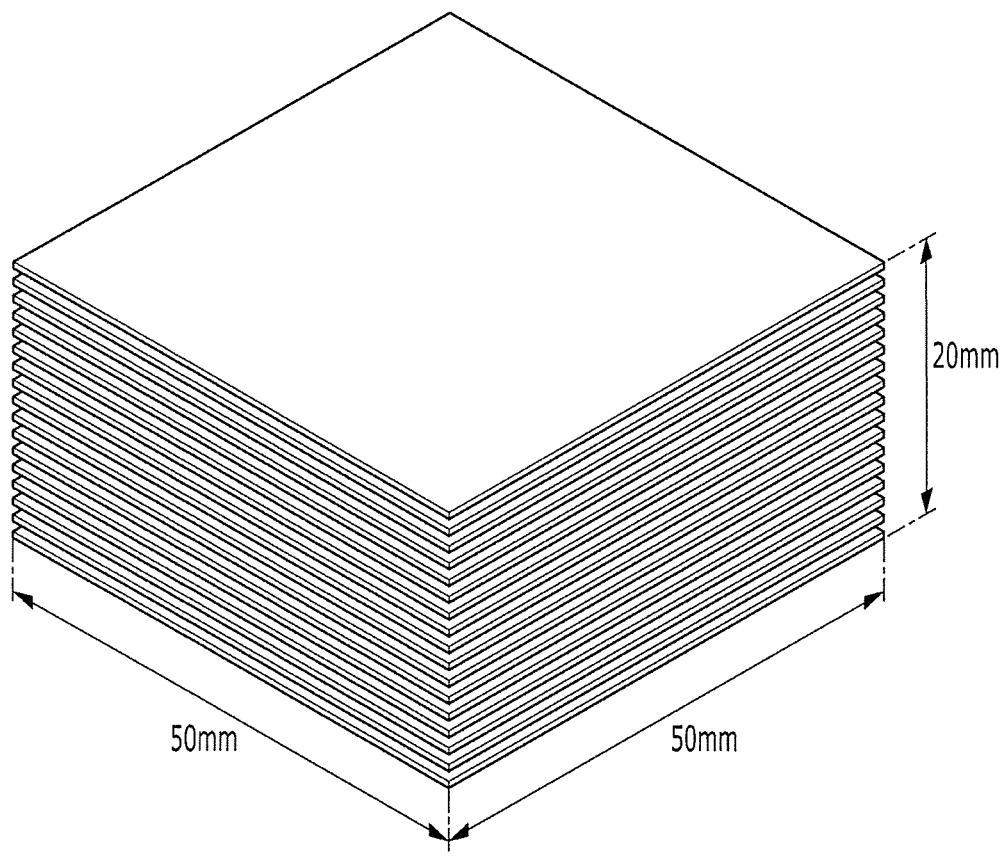
FIG. 1 is a schematic view of a non-oriented electrical steel sheet product.

Embodiments of the present invention provide a non-oriented electrical steel sheet adhesive coating composition, a non-oriented electrical steel sheet product, and a manufacturing method thereof.

A phosphate salt used in embodiments of the present invention is represented by a chemical formula of $M_x(H_3PO_4)_y$, and is defined as a "composite metal phosphate" in order to distinguish it from a metal phosphate represented by $M_x(PO_4)_y$.

The "composite metal phosphate" may be prepared by a reaction of phosphoric acid ($H_3PO_4$) with a metal hydroxide $(M_x(OH)_y)$ or a metal oxide ($M_xO$), and specific examples thereof may be aluminum phosphate monobasic ($Al(H_3PO_4)_3$), cobalt phosphate monobasic ($Co(H_3PO_4)_2$), calcium phosphate monobasic ($Ca(H_3PO_4)_2$), zinc phosphate monobasic ($Zn(H_3PO_4)_2$), magnesium phosphate monobasic ($Mg(H_3PO_4)_2$), and the like that are used in examples.

Hereinafter, embodiments of the present invention are described in detail. However, these embodiments are exemplary, and the present invention is not limited thereto but is defined by the scope of claims.

Non-Oriented Electrical Steel Sheet Adhesive Coating Composition

In an embodiment of the present invention, a non-oriented electrical steel sheet adhesive coating composition is provided. The non-oriented electrical steel sheet adhesive coating composition is a composition including a first component including an organic/inorganic composite and a second component including a composite metal phosphate, the composition includes 70 to 99 wt % of the first component and 1 to 30 wt % of the second component based on a total amount, 100 wt %, of the composition, the organic/inorganic composite is formed by having inorganic nanoparticles chemically substituted with some functional groups in an organic resin, the organic resin is one, or two or more, selected from an epoxy-based resin, an ester-based resin, an acrylic resin, a styrene-based resin, a urethane-based resin, and an ethylene-based resin, and the inorganic nanoparticles are one, or two or more, selected from $SiO_2$, $Al_2O_3$, $TiO_2$, MgO, ZnO, and $ZrO_2$.

The adhesive coating composition shows excellent solution stability, adhesive coating workability, and the like, and may contribute to excellent surface characteristics (e.g., etch resistance, insulation property, close contacting property, and the like) of an adhesive coating layer formed thereof. Particularly, the adhesive coating composition may obtain an excellent high temperature adhesion force and excellent high temperature oil resistance after heat-fusing a plurality of oriented electrical steel sheets by using the adhesive coating composition, and effectively prevent deterioration of surface characteristics and adhesive properties after stress-relief annealing.

In general, when an inorganic material particle is present as a crystalline or amorphous form in an adhesive coating layer, the inorganic material particle is known to continuously hinder a (electron) current flow in the adhesive coating layer and improve an insulation property and heat resistance.

In this regard, an organic/inorganic composite included as the first component may use a nano-sized inorganic material particle (i.e., the inorganic nanoparticle), wherein the "nanoparticle" has a particle size of 1 to 1000 nm, and specifically 1 to 100 nm.

When the inorganic nanoparticles are chemically substituted in some functional groups in the organic resin, the inorganic nanoparticles are densely and uniformly distributed in the whole surface of the adhesive coating layer.

Specifically, the inorganic nanoparticles use the organic resin as a medium during formation of the adhesive coating layer, and may be prevented from precipitation or agglomeration and thus show excellent surface characteristics after stress-relief annealing. Accordingly, the insulation Do property, heat resistance, surface characteristics, and the like may be more improved when the organic resin is used as a medium than when the organic resin and the inorganic nanoparticles are respectively included.

On the other hand, the composite metal phosphate included as the second component contributes to adhesive properties after heat fusion and stress-relief annealing, and may be mixed with the first component in an appropriate ratio.

Each amount of the first component and the second component may be appropriately adjusted by considering their functions. Specifically, the first component may be included in an amount of 70 to 99 wt % (specifically, 80 to 97 wt %), and the second component may be used in an amount of 1 to 30 wt % (specifically, 3 to 20 wt %), based on 100 wt % of the adhesive coating composition.

When each amount range is satisfied, all the desired characteristics in an embodiment of the present invention may be harmoniously accomplished. On the contrary, when the first component is included in an amount of 99 wt % and the second component is included in an amount of less than 1 wt %, high temperature adherence and high temperature oil resistance may be deteriorated. Further, when the first component is used in an amount of greater than or equal to 30 wt % and the second component is used in an amount of greater than 99 wt %, an adhesion force may be deteriorated. This fact is supported through the following evaluations.

Specifically, the first component and the second component are as follows.

The organic/inorganic composite may have a form such that inorganic nanoparticles of one kind are substituted in some functional groups in one kind of organic resin, and one kind of this organic/inorganic composite or a mixture of two or more kinds thereof may be included in the first component.

For example, the first component may be one organic/inorganic composite or a mixture of two or more selected from a $SiO_2$-epoxy composite, an $Al_2O_3$-epoxy composite, a $TiO_2$-epoxy composite, a $SiO_2$-ester composite, a ZnO-ester composite, a $SiO_2$-acrylic composite, an $Al_2O_3$-acrylic composite, a ZnO-acrylic composite, a $ZrO_2$-acrylic composite, a $SiO_2$-styrene composite, a $TiO_2$-styrene composite, a MgO-styrene composite, a $SiO_2$-urethane composite, an $Al_2O_3$-urethane composite, a ZnO-urethane composite, a $SiO_2$-ethylene composite, an $Al_2O_3$-ethylene composite, and a ZnO-ethylene composite.

Particularly, when the first component is a mixture of at least two kinds of the above organic/inorganic composites, heat fusion and adhesive properties after stress-relief annealing may be further improved.

More specifically, when the first component is a mixture, it may be selected from a mixture of the $SiO_2$-epoxy composite and the $Al_2O_3$-epoxy composite in a weight ratio of 1:1, a mixture of the $SiO_2$-epoxy composite and the $TiO_2$-epoxy composite in a weight ratio of 1:1, a mixture of the $SiO_2$-ester composite and the ZnO-ester composite in a weight ratio of 1:1, a mixture of the $SiO_2$-styrene composite and the MgO-styrene composite in a weight ratio of 1:1, a mixture of the $SiO_2$-styrene composite and the $TiO_2$-styrene composite in a weight ratio of 1:1, a mixture of the $Al_2O_3$-urethane composite and the ZnO-urethane composite in a weight ratio of 1:1, a mixture of the $SiO_2$-urethane composite and the ZnO-urethane composite in a weight ratio of 1:1, a mixture of the $SiO_2$-ethylene composite and the $Al_2O_3$-ethylene composite in a weight ratio of 1:1, a mixture of the $SiO_2$-ethylene composite and the ZnO-ethylene composite in a weight ratio of 1:1, a mixture of the $SiO_2$-epoxy, the $Al_2O_3$-epoxy, and the $TiO_2$-epoxy composite in a weight ratio of 1:1:1, a mixture of the $SiO_2$-acrylic composite, the $Al_2O_3$-acrylic composite, and the ZnO-acrylic composite in a weight ratio of 1:1:1, a mixture of the $SiO_2$-styrene composite, the $TiO_2$-styrene composite, and the MgO-styrene composite in a weight ratio of 1:1:1, a mixture of the $SiO_2$-urethane composite, the $Al_2O_3$-urethane composite, and the ZnO-urethane composite in a weight ratio of 1:1:1, and a mixture of the $SiO_2$-ethylene composite, the $Al_2O_3$-ethylene composite, and the ZnO-ethylene composite in a weight ratio of 1:1:1.

As described above, the composite metal phosphate represented by the chemical formula of $M_x(H_3PO_4)_y$ is distinguished from a metal phosphate represented by the chemical formula of $M_x(PO_4)_y$. One or more kinds of mixtures of such a composite metal phosphate may be included in the second component.

For example, it may be one composite metal phosphate or a mixture of two or more selected from aluminum phosphate monobasic ($Al(H_3PO_4)_3$), cobalt phosphate monobasic ($Co(H_3PO_4)_2$), calcium phosphate monobasic ($Ca(H_3PO_4)_2$), zinc phosphate monobasic ($Zn(H_3PO_4)_2$), and magnesium phosphate monobasic ($Mg(H_3PO_4)_2$). According to desirable properties (insulation properties, heat resistance, surface characteristics, etc.) of the adhesive coating layer, at least two of the composite metal phosphates exemplified above may be mixed.

More specifically, when the second component is a mixture, it may be may be selected from a mixture of the aluminum phosphate monobasic ($Al(H_3PO_4)_3$) and the cobalt phosphate monobasic ($Co(H_3PO_4)_2$) in a weight ratio of 1:1, a mixture of the cobalt phosphate monobasic ($Co(H_3PO_4)_2$) and the zinc phosphate monobasic ($Zn(H_3PO_4)_2$) in a weight ratio of 1:1, a mixture of the aluminum phosphate monobasic ($Al(H_3PO_4)_3$) and the magnesium phosphate monobasic ($Mg(H_3PO_4)_2$) in a weight ratio of 1:1, a mixture of the cobalt phosphate monobasic ($Co(H_3PO_4)_2$) and the calcium phosphate monobasic ($Ca(H_3PO_4)_2$) in a weight ratio of 1:1, a mixture of the calcium phosphate monobasic ($Ca(H_3PO_4)_2$) and the zinc phosphate monobasic ($Zn(H_3PO_4)_2$) in a weight ratio of 1:1, a mixture of the aluminum phosphate monobasic ($Al(H_3PO_4)_3$), the cobalt phosphate monobasic ($Co(H_3PO_4)_2$), and the calcium phosphate monobasic ($Ca(H_3PO_4)_2$) in a weight ratio of 1:1:1, and a mixture of the aluminum phosphate monobasic ($Al(H_3PO_4)_3$), the calcium phosphate monobasic ($Ca(H_3PO_4)_2$), and the magnesium phosphate monobasic ($Mg(H_3PO_4)_2$) in a weight ratio of 1:1:1.

More specifically, constituting materials of the first component are as follows.

A method of substituting the inorganic nanoparticles in some (e.g., an terminal end) substituents of the organic resin may be generally well known, for example, a method of modifying the inorganic nanoparticles by using a catalyst such as phosphoric acid and the like, and herein, the inorganic nanoparticles may have a colloid form.

The organic resin may be included in an amount of 70 to 99.9 wt % based on 100 wt % of the first component. In addition, the inorganic nanoparticles may be included in an amount of 0.1 to 30 parts by weight based on 100 parts by weight of a solid content of the organic resin.

When the inorganic nanoparticles are included in an amount of 0.1 wt % and the organic resin is included in an amount of 99.9 wt % in the first component, heat resistance is deteriorated, and resultantly, an effect of improving high temperature adherence may become insignificant. On the contrary, when the inorganic nanoparticles is included in an amount of 30 wt %, and the organic resin is included in an amount of 70 wt % in the first component, room temperature and high temperature adherences may be deteriorated.

A weight ratio of the inorganic nanoparticles relative to the metal phosphate may be 0.01:1 to 0.2:1. When the inorganic particles are used in too small an amount to reach the weight ratio of 0.01:1, heat resistance may be deteriorated. On the contrary, when the inorganic nanoparticles are used in an excessively large amount in the weight ratio of greater than or equal to 0.2:1, the amount of the metal phosphate is relatively reduced, and thus adhesion force may be deteriorated.

The organic resin may have a number average molecular weight of 1000 to 40,000 and a weight average molecular weight of 1000 to 50,000. When the molecular weight is less than the lower limit, strength of an adhesive coating layer may be deteriorated. However, when each molecular weight is greater than the upper limit, phase separation may occur in the organic resin resulting in lower compatibility with the composite metal phosphate.

In addition, the organic resin may have a softening point (Tg) of less than or equal to 200° C. When the organic resin has a softening point (Tg) of greater than or equal to 200° C., the composition has so high viscosity that coating workability may be deteriorated.

Meanwhile, the inorganic nanoparticles may have an average particle diameter of 3 to 30 nm. Specifically, different kinds of the inorganic nanoparticles may have different average particle diameters, for example, $SiO_2$: 3 to 20 nm, $Al_2O_3$: 5 to 20 nm, $TiO_2$: 10 to 30 nm, MgO: 10 to 30 nm, ZnO: 10 to 20 nm, and $ZrO_2$: 10 to 40 nm.

When the different kinds of the inorganic nanoparticles have a lesser average particle diameter than the range, it may not only take a long time to react them with the organic resin, but also requires a high cost, which is not economical.

On the contrary, when the different kinds of the inorganic nanoparticles have a larger average particle diameter than the range, compatibility with the organic resin may be deteriorated, a weak boundary layer (WBL) is generated on the interface with a non-oriented electrical steel sheet, and oil or moisture may flow in through the weak boundary layer and deteriorate adherence.

On the other hand, as briefly mentioned above, the composite metal phosphate included as the second component may be prepared through a reaction of a metal hydroxide ($M_x(OH)_y$) or a metal oxide ($M_xO$) with phosphoric acid ($H_3PO_4$).

For example, when a metal hydroxide ($M_x(OH)_y$) or a metal oxide ($M_xO$) is respectively used based on 100 parts by weight of a phosphoric acid aqueous solution including 85 wt % of free phosphoric acid ($H_3PO_4$) and reacted at 80 to 90° C. for 6 to 10 hours, each composite metal phosphate may be obtained.

Herein, as for an amount of the metal hydroxide ($M_x(OH)_y$) or metal oxide ($M_xO$), hydroxide aluminum ($Al(OH)_3$) may be used in an amount of 1 to 40 parts by weight, cobalt hydroxide ($Co(OH)_2$) may be used in an amount of 1 to 10 parts by weight, calcium oxide (CaO) may be used in an amount of 1 to 15 parts by weight, zinc oxide (ZnO) may be used in an amount of 1 to 20 parts by weight, and magnesium oxide (MgO) may be used in an amount of 1 to 10 parts by weight, based on 100 parts by weight of the phosphoric acid aqueous solution.

More specifically, the second component may be a mixture selected from a mixture of the aluminum phosphate monobasic ($Al(H_3PO_4)_3$) and the cobalt phosphate monobasic ($Co(H_3PO_4)_2$) in a weight ratio of 1:1, a mixture of the cobalt phosphate monobasic ($Co(H_3PO_4)_2$) and the zinc phosphate monobasic ($Zn(H_3PO_4)_2$) in a weight ratio of 1:1, a mixture of the aluminum phosphate monobasic ($Al(H_3PO_4)_3$) and the magnesium phosphate monobasic ($Mg(H_3PO_4)_2$) in a weight ratio of 1:1, a mixture of the cobalt phosphate monobasic ($Co(H_3PO_4)_2$) and the calcium phosphate monobasic ($Ca(H_3PO_4)_2$) in a weight ratio of 1:1, a mixture of the calcium phosphate monobasic ($Ca(H_3PO_4)_2$) and the zinc phosphate monobasic ($Zn(H_3PO_4)_2$) in a weight ratio of 1:1, a mixture of the aluminum phosphate monobasic ($Al(H_3PO_4)_3$), the cobalt phosphate monobasic ($Co(H_3PO_4)_2$), and the calcium phosphate monobasic ($Ca(H_3PO_4)_2$) in a weight ratio of 1:1:1, and a mixture of the aluminum phosphate monobasic ($Al(H_3PO_4)_3$), the calcium phosphate monobasic ($Ca(H_3PO_4)_2$), and the magnesium phosphate monobasic ($Mg(H_3PO_4)_2$) in a weight ratio of 1:1:1.

Non-Oriented Electrical Steel Sheet Product

In another embodiment of the present invention, a non-oriented electrical steel sheet product includes:

a plurality of non-oriented electrical steel sheets; and an adhesive coating layer between the plurality of non-oriented electrical steel sheets;

wherein the adhesive coating layer includes a first component including an organic/inorganic composite and a second component including a composite metal phosphate, the adhesive coating layer includes 70 to 99 wt % of the first component and 1 to 30 wt % of the second component based on a total amount, 100 wt %, of the adhesive coating layer, the organic/inorganic composite is formed by having inorganic nanoparticles chemically substituted with some functional groups in an organic resin, the organic resin is one, or two or more, selected from an epoxy-based resin, an ester-based resin, an acrylic resin, a styrene-based resin, a urethane-based resin, and an ethylene-based resin, and the inorganic nanoparticles are one, or two or more, selected from $SiO_2$, $Al_2O_3$, $TiO_2$, MgO, ZnO, and $ZrO_2$.

As illustrated later, the non-oriented electrical steel sheet product may be manufactured by heat-fusing different non-oriented electrical steel sheets by simply using the above adhesive coating composition instead of a conventional method of welding, clamping, interlocking, and the like.

Herein, the non-oriented electrical steel sheet product shows excellent high temperature adherence and high temperature oil resistance after the heat fusion and no deterioration of surface characteristics and adhesive properties particularly after stress-relief annealing, depending on characteristics of the above adhesive coating composition.

In this regard, the inorganic nanoparticles may be uniformly distributed in the adhesive coating layer.

More specifically, the inorganic nanoparticles may be distributed in 1 to 10 area % based on a total area, 100 area %, of the adhesive coating layer. When the inorganic nanoparticles are distributed in less than or equal to 1 area % in the adhesive coating layer, heat resistance before and after stress-relief annealing may be deteriorated, but when the inorganic nanoparticles are distributed in greater than or equal to 10 area % in the adhesive coating layer, an adhesion force before or after the stress-relief annealing may be deteriorated.

The adhesive coating layer may have a thickness of 0.5 to 10 μm. When the adhesive coating layer has a thickness of less than or equal to 0.5 μm, an adhesion force before or after stress-relief annealing may be deteriorated, while when the adhesive coating layer has a thickness of greater than or equal to 10 μm, an occupying ratio after the lamination may be deteriorated.

Components of the adhesive coating layer are the same as illustrated above and will not be described again.

Meanwhile, the plurality of non-oriented electrical steel sheets may be a non-oriented electrical steel sheet consisting of C: 0.03 wt % or less (excluding 0 wt %), Si: 4.0 wt % or less (excluding 0 wt %), P: 0.1 wt % or less (excluding 0 wt %), S: 0.01 wt % or less (excluding 0 wt %), Mn: 2.0 wt % or less (excluding 0 wt %), Al: 3.0 wt % or less (excluding 0 wt %), N: 0.003 wt % or less (excluding 0 wt %), Sb: 0.1 wt % or less (excluding 0 wt %), Sn: 0.1 wt % or less (excluding 0 wt %), Mg: 0.01 wt % or less (excluding 0 wt %), and a balance of Fe and other unavoidable impurities, and reasons for limiting amounts of each component are as follows.

C: 0.03 wt % or less (excluding 0 wt %)

C is an element bound to a microelement such as Nb, Ti, and V and forming minute carbides, and has an effect of increasing nucleation sites during recrystallization and finely pulverizing a crystal grain and thus increasing strength. However, a lower limit of C is not set, since strength improvement due to carbide is not necessary in the examples of the present invention, but an upper limit of C is set to be 0.03 wt % by considering a core loss due to carbide.

Si: 4.0 wt % or less (excluding 0 wt %)

Si is an element that increases resistivity and thus lowers an eddy current loss during core loss and simultaneously increases strength. When Si is included in an amount of greater than 4.0 wt %, cold rolling is deteriorated and strip breakage occurs, and thus the amount of Si is limited within the range in the examples of the present invention.

P: 0.1 wt % or less (excluding 0 wt %)

P is added to increase resistivity and improve texture and thus magnetic properties. When P is excessively added, cold rolling is deteriorated, and thus an amount of P is limited to be less than or equal to 0.1% in the examples of the present invention.

S: 0.01 wt % or less (excluding 0 wt %)

S forms a fine precipitate of MnS and CuS, and thus deteriorates magnetic characteristics and thus needs to be maintained at a low level, and accordingly, an amount of S is limited to be less than or equal to 0.01 wt % in the examples of the present invention.

Mn: 2.0 wt % or less (excluding 0 wt %)

When Mn is used in an amount of greater than 2.0 wt %, magnetic properties are deteriorated, and thus an amount of Mn is limited within the range in the examples of the present invention.

Al: 3.0 wt % or less (excluding 0 wt %)

Al is an effective component in increasing resistivity and reducing the core loss. An amount of Al in the examples of the present invention is limited within the range.

N: 0.003 wt % or less (excluding 0 wt %)

N forms a minute and long AlN precipitate inside the parent material and suppresses growth of a crystal grain and thus needs to be included in a small amount, and the amount is limited to be less than or equal to 0.003% in the examples of the present invention.

Sb: 0.1 wt % or less (excluding 0 wt %)

Sb is an essential element in the present invention and has an effect of preventing oxy-nitriding of the surface, improving a (001) texture, and simultaneously being bound to Mg and thus forming a minute precipitate and resultantly delaying recrystallization. When Sb is included in an amount of greater than 0.1 wt %, the core loss is excessively deteriorated, and thus the amount of Sb is limited within the range in the examples of the present invention.

Sn: 0.1 wt % or less (excluding 0 wt %)

Sn is also an essential element of the present invention, and has an effect of preventing oxy-nitriding of the surface and improving a (001) texture, and simultaneously being bound to Mg and forming a minute precipitate and resultantly delaying recrystallization. When Sn is included in an amount of greater than 0.1 wt %, the core loss is excessively deteriorated, and the amount of Sn is limited within the range in the examples of the present invention.

Mg: 0.01 wt % or less (excluding 0 wt %)

Mg is an essential element along with Sb and Sn in the examples of the present invention, and has an effect of being bound to Sb and Sn and forming a minute precipitate and resultantly delaying recrystallization. When Mg is included in an amount of greater than 0.01 wt %, the core loss is excessively deteriorated, and the amount of Mg is limited within the range in the examples of the present invention.

The non-oriented electrical steel sheet may be manufactured by hot rolling a steel slab while satisfying each component and each amount in a temperature range of 1000 to 1300° C. and at a pressure of 1500 to 2000 tons, winding the resultant, washing it with an acid while an AP (annealing and pickling) process is performed or not, cold-rolling the resultant in a temperature range of 100 to 300° C. and at a pressure of 800 to 1000 tons, and annealing the resultant in a temperature range of 780 to 900° C. for 1 to 5 minutes.

Method of Manufacturing Non-Oriented Electrical Steel Sheet Product

In another embodiment of the present invention, a method of manufacturing a non-oriented electrical steel sheet product includes:

preparing an adhesive coating composition; adhering a plurality of non-oriented electrical steel sheets with the adhesive coating composition; and stress-relief annealing (SRA) a plurality of non-oriented electrical steel sheets adhered thereto with the adhesive coating composition to obtain a non-oriented electrical steel sheet product, wherein the adhesive coating composition is a composition including a first component including an organic/inorganic composite and a second component including a composite metal phosphate, the composition includes 70 to 99 wt % of the first component and 1 to 30 wt % of the second component based on a total amount, 100 wt %, of the composition, the organic/inorganic composite is formed by having inorganic nanoparticles chemically substituted with some functional groups in an organic resin, the organic resin is one, or two or more, selected from an epoxy-based resin, an ester-based resin, an acrylic resin, a styrene-based resin, a urethane-based resin, and an ethylene-based resin, and the inorganic nanoparticles are one, or two or more, selected from $SiO_2$, $Al_2O_3$, $TiO_2$, MgO, ZnO, and $ZrO_2$.

As briefly illustrated above, the method is to heat-fuse the different non-oriented electrical steel sheets, not by using a conventional method of welding, clamping, interlocking, and the like, but by simply using the above adhesive coating composition.

Specifically, the adhering of a plurality of non-oriented electrical steel sheets with the adhesive coating composition may include: applying the adhesive coating composition on one surface or both surfaces of the plurality of non-oriented electrical steel sheets; curing the applied adhesive coating composition to form an adhesive coating layer; and laminating another sheet of the plurality of non-oriented electrical steel sheets on the adhesive coating layer and performing heat fusion.

Herein, the curing of the applied adhesive coating composition to form an adhesive coating layer may be performed in a temperature range of 200 to 600° C. for 5 to 40 seconds.

In addition, the laminating of another sheet of the plurality of non-oriented electrical steel sheets on the adhesive coating layer and performing heat fusion may be performed in a temperature range of 100 to 300° C. and in a pressure range of 0.01 to 5 MPa, for 6 seconds to 180 minutes.

Meanwhile, the stress-relief annealing (SRA) of a plurality of non-oriented electrical steel sheets adhered thereto with the adhesive coating composition to obtain a non-oriented electrical steel sheet product may be performed in a temperature range of 500 to 900° C. for 60 to 180 minutes under a mixed gas atmosphere of a modifying gas and nitrogen ($N_2$) gas.

Specifically, the nitrogen gas may be included at 90 volume % or greater (excluding 100 volume %) based on 100 volume % of the mixed gas.

More specifically, the modifying gas may include a mixed gas of air and LNG.

When the condition of each step is satisfied, magnetic properties (specifically, core loss, magnetic flux density, and the like) of the non-oriented electrical steel sheets themselves may not only be improved after the stress-relief annealing, but excellent high temperature adherence and high temperature oil resistance may also be obtained by the adhesive coating layer, and particularly, surface characteristics and adhesive properties may not be deteriorated after the stress-relief annealing.

Hereinafter, preferred examples of the present invention, comparative examples compared to the examples, and evaluation examples thereof are described. However, the following examples are merely preferred exemplary embodiment of the present invention, and the present invention is not limited to the following examples.

Specifically, a non-oriented electrical steel sheet (50×50 mm) according to a preparation example is used as a common specimen, each adhesive coating composition according to examples or comparative examples is used to adhere different non-oriented electrical steel sheets, and characteristics thereof before and after stress-relief annealing are compared and evaluated.

Preparation Example: Manufacture of Non-Oriented Electrical Steel Sheet

A steel slab including C: 0.03 wt % or less (excluding 0 wt %), Si: 4.0 wt % or less (excluding 0 wt %), P: 0.1 wt % or less (excluding 0 wt %), S: 0.01 wt % or less (excluding 0 wt %), Mn: 2.0 wt % or less (excluding 0 wt %), Al: 3.0 wt % or less (excluding 0 wt %), N: 0.003 wt % or less (excluding 0 wt %), Sb: 0.1 wt % or less (excluding 0 wt %), Sn: 0.1 wt % or less (excluding 0 wt %), Mg: 0.01 wt % or less (excluding 0 wt %), and a balance of Fe and other unavoidable impurities was prepared, was hot-rolled in a temperature range of 1000 to 1300° C. and a pressure of 1500 to 2000 tons, was wound, was washed with an acid while an AP (annealing and pickling) process was performed or not, and was cold-rolled in a temperature range of 100 to 300° C. and at a pressure of 800 to 1000 tons, and then was finally annealed at 780 to 900° C. for 1 to 5 minutes.

Examples 1 to 25

(1) Preparation of Organic/Inorganic Composite

An organic/inorganic composite was prepared by chemically substituting a terminal substituent of one kind of organic resin with one kind of inorganic nanoparticles.

Specifically, one kind of organic resin selected from an epoxy-based resin (weight average molecular weight: 15,000, softening point: 80° C.), an ester-based resin (weight average molecular weight: 7000, softening point: 70° C.), an acryl-based resin (weight average molecular weight: 10,000, softening point: 120° C.), a styrene-based resin (weight average molecular weight: 5000, softening point: 60° C.), a urethane-based resin (weight average molecular weight: 30,000 softening point: 140° C.), and an ethylene-based resin (weight average molecular weight: 20,000, softening point: 120° C.) was used.

In addition, one kind of the inorganic nanoparticles selected from $SiO_2$ (average particle diameter: 7 nm), $Al_2O_3$ (average particle diameter: 10 nm), $TiO_2$ (average particle diameter: 20 nm), MgO (average particle diameter: 25 nm), ZnO (average particle diameter: 15 nm), and ZrO (average particle diameter: 30 nm) was used.

The organic resin and the inorganic nanoparticles were mixed in a weight ratio of 9:1, and a substitution reaction was performed by using phosphoric acid as a catalyst to prepare each of a $SiO_2$-epoxy composite, an $Al_2O_3$-epoxy composite, a $TiO_2$-epoxy composite, a $SiO_2$-ester composite, a ZnO-ester composite, a $SiO_2$-acrylic composite, an $Al_2O_3$-acrylic composite, a ZnO-acrylic composite, a $SiO_2$-styrene composite, a $TiO_2$-styrene composite, an MgO-styrene composite, a $SiO_2$-urethane composite, an $Al_2O_3$-urethane composite, a ZnO-urethane composite, a $SiO_2$-ethylene composite, an $Al_2O_3$-ethylene composite, and a ZnO-ethylene composite.

(2) Preparation of Composite Metal Phosphate

A composite metal phosphate was prepared using a reaction of a metal hydroxide ($M_x(OH)_y$) or a metal oxide ($M_xO$), and phosphoric acid ($H_3PO_4$).

Specifically, as the phosphoric acid, a phosphoric acid aqueous solution including 85 wt % of free phosphoric acid ($H_3PO_4$) was used.

Examples of the metal hydroxide ($M_x(OH)_y$) or metal oxide ($M_xO$) include aluminum hydroxide ($Al(OH)_3$), cobalt hydroxide ($Co(OH)_2$), calcium oxide (CaO), zinc oxide (ZnO), and magnesium oxide (MgO).

The metal hydroxide ($M_x(OH)_y$) or the metal oxide ($M_xO$) was used based on 100 parts by weight of the phosphoric acid aqueous solution and reacted at 80° C. for 2 hours to prepare monobasic aluminum phosphate ($Al(H_3PO_4)_3$), monobasic cobalt phosphate ($Co(H_3PO_4)_2$), monobasic calcium phosphate ($Ca(H_3PO_4)_2$), monobasic zinc phosphate ($Zn(H_3PO_4)_2$), or monobasic magnesium phosphate ($Mg(H_3PO_4)_2$).

Herein, the metal hydroxide ($M_x(OH)_y$) or metal oxide ($M_xO$) was used in an amount of 20 parts by weight for aluminum hydroxide ($Al(OH)_3$), 5 parts by weight for cobalt hydroxide ($Co(OH)_2$), 5 parts by weight for calcium oxide (CaO), 7 parts by weight for zinc oxide (ZnO), and 10 parts by weight for magnesium oxide (MgO) based on 100 parts by weight of the phosphoric acid aqueous solution.

(3) Preparation of Adhesive Coating Composition

One or a mixture of two or more kinds in the organic/inorganic composite prepared in the above (1) as a first component, and one or a mixture of two or more kinds of the composite metal phosphate prepared in the above (2) as a second component, were used to prepare an adhesive coating composition.

Herein, each amount of the first component and the second component based on an entire amount of the adhesive coating composition and a weight ratio of inorganic nanoparticles to metal phosphate were respectively used to satisfy those of Examples 1 to 25 shown in Table 1.

(4) Manufacture of Non-Oriented Electrical Steel Sheet Product

The non-oriented electrical steel sheet (50×50 mm) of the preparation example was used as a common specimen, and each adhesive coating composition of Examples 1 to 25 was used to adhere the different common specimens by using a bar coater and a roll coater.

Specifically, the adhesive coating composition was applied to have a predetermined thickness (about 5.0 μm, about 10 g/m² per surface) on each upper and lower surface of the different common specimens, cured at 400° C. for 20 seconds, and slowly cooled down in the air.

Subsequently, each common specimen applied with the adhesive coating composition was laminated to be 20 mm high and heat-fused with a pressure of 500 N at 200° C. for 30 minutes.

Then, the heat-fused common specimens were stress-relief annealed under a mixed gas atmosphere of a modifying gas and nitrogen ($N_2$) (specifically, 99 volume % of the nitrogen gas in the mixed gas) at 800° C. for 120 minutes. Herein, the modifying gas was a mixture of air:LNG in a volume ratio of 8:1.

TABLE 1

| | Adhesive coating composition (first component + second component = total amount of 100 wt %) | | | | Weight ratio of inorganic |
|---|---|---|---|---|---|
| | First component | | Second component | | |
| | Organic/inorganic composite | wt % | Composite metal phosphate | wt % | nanoparticles/ metal phosphate |
| Example 1 | $SiO_2$-epoxy | 99 | MAP | 1 | 14.3 |
| Example 2 | $Al_2O_3$-epoxy | 94.1 | MAP:McoP = 1:1 | 5.9 | 2.4 |
| Example 3 | $SiO_2$-ester | 87.5 | MCP | 12.5 | 0.4 |
| Example 4 | ZnO-ester | 83.2 | MCP:MZP = 1:1 | 16.8 | 0.2 |
| Example 5 | $SiO_2$-styrene | 76.0 | MMP | 24.0 | 0.3 |

TABLE 1-continued

Adhesive coating composition
(first component + second component = total amount of 100 wt %)

| | First component | | Second component | | Weight ratio of inorganic nanoparticles/ metal phosphate |
|---|---|---|---|---|---|
| | Organic/inorganic composite | wt % | Composite metal phosphate | wt % | |
| Example 6 | MgO-styrene | 98.9 | MAP:MMP = 1:1 | 1.1 | 9.0 |
| Example 7 | $Al_2O_3$-urethane | 94.1 | MCoP | 5.9 | 0.8 |
| Example 8 | ZnO-urethane | 87.5 | MCoP:MCP = 1:1 | 12.5 | 0.4 |
| Example 9 | $SiO_2$-ethylene | 83.2 | MZP | 16.8 | 1.0 |
| Example 10 | $Al_2O_3$-ethylene | 76.0 | MZP:MMP | 24.0 | 0.6 |
| Example 11 | $SiO_2$-epoxy:$Al_2O_3$-epoxy = 1:1 | 98.9 | MAP | 1.1 | 13.5 |
| Example 12 | $SiO_2$-epoxy:$TiO_2$-epoxy = 1:1 | 94.1 | MAP:MCoP = 1:1 | 5.9 | 1.9 |
| Example 13 | $SiO_2$-ester:ZnO-ester = 1:1 | 87.5 | MCP | 12.5 | 0.7 |
| Example 14 | $SiO_2$-styrene:MgO-styrene = 1:1 | 83.2 | MCP:MZP = 1:1 | 16.8 | 1.2 |
| Example 15 | $SiO_2$-styrene:MgO-styrene = 1:1 | 76.0 | MMP | 24.0 | 0.8 |
| Example 16 | $SiO_2$-styrene:$TiO_2$-styrene = 1:1 | 98.9 | MAP:MMP = 1:1 | 1.1 | 9.0 |
| Example 17 | $Al_2O_3$-urethane:ZnO-urethane = 1:1 | 94.1 | MCoP | 5.9 | 1.6 |
| Example 18 | $SiO_2$-urethane:ZnO-urethane = 1:1 | 87.5 | MCoP:MCP = 1:1 | 12.5 | 0.7 |
| Example 19 | $SiO_2$-ethylene:$Al_2O_3$-ethylene = 1:1 | 83.2 | MZP | 16.8 | 0.5 |
| Example 20 | $SiO_2$-ethylene:ZnO-ethylene = 1:1 | 76.0 | MZP:MMP | 24.0 | 0.3 |
| Example 21 | $SiO_2$-epoxy:$Al_2O_3$-epoxy:$TiO_2$-epoxy: = 1:1:1 | 98.9 | MAP:MCoP:MCP = 1:1:1 | 1.1 | 9.0 |
| Example 22 | $SiO_2$-acryl:$Al_2O_3$-acryl:ZnO-acryl = 1:1:1 | 94.1 | MAP:MCoP:MCaP = 1:1:1 | 5.9 | 3.2 |
| Example 23 | $SiO_2$-styrene:$TiO_2$-styrene: MgO-styrene: = 1:1:1 | 87.5 | MAP:MCP:MMP = 1:1:1 | 12.5 | 1.8 |
| Example 24 | $SiO_2$-urethane:$Al_2O_3$-urethane:ZnO-urethane = 1:1:1 | 83.2 | MAP | 16.8 | 1.5 |
| Example 25 | $SiO_2$-ethylene:$Al_2O_3$-ethylene:ZnO-ethylene = 1:1:1 | 76.0 | MZP | 24.0 | 0.3 |

[Note 1:
Expression of Composite Metal Phosphate]
MAP = $Al(H_3PO_4)_2$, MCoP = $Co(K_3PO_4)_2$, MCP = $Ca(H_3PO_4)_2$, MZP = $Zn(H_3PO_4)_2$, MMP = $Mg(H_3PO_4)_2$
[Note 2:
Expression of Weight Ratio]

A weight ratio of components respectively included in organic/inorganic composite and composite metal phosphate.

Comparative Examples 1 and 2

(1) Selection of Organic Resin

An acryl-styryl composite resin (weight average molecular weight: 4000, softening point: 50° C.) (Comparative Example 1) or a mixture of an acrylic resin (weight average molecular weight: 7000, softening point: 40° C.) and an epoxy resin (weight average molecular weight: 3000, softening point: 45° C.) (Comparative Example 2) was used instead of preparing the organic/inorganic composite.

(2) Selection of Chromate or Metal Phosphate

Chromate ($MgCrO_3$) (Comparative Example 1) or a composite metal phosphate ($Al(H_3PO_4)_3$:$Zn(H_3PO_4)_2$ in a weight ratio of 3:1) (Comparative Example 2) was used instead of preparing the composite metal phosphate.

(3) Preparation of Adhesive Coating Composition

An adhesive coating composition was prepared by using an organic resin selected in the above (1) as a first component and chromate or a metal phosphate selected in the above (2) as a second component.

Herein, each amount of the first component and the second component based on an entire amount of the adhesive coating composition was used to satisfy those of Comparative Examples 1 and 2 shown in Table 2.

(4) Manufacture of Non-Oriented Electrical Steel Sheet Product

A non-oriented electrical steel sheet (50×50 mm) according to a preparation example was used as a common specimen, and each adhesive coating composition according to Comparative Examples 1 and 2 was used to adhere different common specimens with a bar coater and a roll coater. The adhesion was performed under the same specific conditions as for the examples.

TABLE 2

| | Adhesive coating composition (first component + second component = total amount 100 wt %) | | | |
|---|---|---|---|---|
| | First component | | Second component | |
| | Organic resin | wt % | Composite metal phosphate | wt % |
| Comparative Example 1 | acryl-styryl composite resin | 50 | Chromate (MgCrO₃ alone) | 50 |
| Comparative Example 2 | acryl:epoxy = 50:50 | 40 | Mixture of phosphate salt (Al(H₃PO₄)₃:Zn(H₃PO₄)₂ in a weight ratio of 3:1) | 60 |

Evaluation Example 1: Solution Stability of Adhesive Coating Composition, Surface Characteristics of Adhesive Coating Layer, and Adhesion Force Before and after SRA Characteristics of the adhesive coating compositions of Examples 1 to 25 and Comparative Examples 1 and 2, surface characteristics of each adhesive coating layer respectively formed of the adhesive coating compositions, and an adhesion force before and after stress-relief annealing were respectively evaluated, and the results are shown in Table 3.

The evaluations were performed under the specific following specific conditions.

Solution Stability:

Each adhesive coating composition was vigorously stirred with an agitator for 30 minutes and maintained without stirring for 30 minutes. Whether a precipitate was present or not in the compositions, or a gel phenomenon occurred or not, was judged.

Surface Characteristics:

The insulation property, etch resistance, and close contacting property of a coating layer formed of each adhesive coating composition before the heat fusion were comprehensively examined and evaluated, and when all of three were excellent, very excellent was given, when two of them were excellent, excellent was given, when one of them was excellent, average was given, and when all three were insufficient, insufficient was given.

Adhesion Force:

An adhesion force of each laminated sample before and after stress-relief annealing was measured by fixing the sample with upper/lower jigs under a predetermined force and then pulling the sample at a predetermined speed. Herein, a point that the interface of the laminated sample had a minimum adhesion force and was torn away out of the entire interface of the laminated sample was measured.

The adhesion force before and after stress-relief annealing was evaluated according to each different reference. When the adhesion force after the heat fusion but before the stress-relief annealing was greater than or equal to 1.0 MPa, very excellent was given, when the adhesion force was greater than or equal to 0.5 MPa, excellent was given, when the adhesion force was greater than or equal to 0.2 MPa, average was given, and when the adhesion force was less than or equal to 0.1 MPa, insufficient was given. On the other hand, when the adhesion force after the stress-relief annealing was greater than or equal to 0.5 MPa, very excellent was give, when the adhesion force was greater than or equal to 0.2 MPa, excellent was given, when the adhesion force was greater than or equal to 0.1 MPa, average was given, and when the adhesion force was less than or equal to 0.05 MPa, insufficient was given.

TABLE 3

| | Characteristics of adhesive coating composition and surface characteristics of adhesive coating layer | | | |
|---|---|---|---|---|
| | Solution stability | Surface characteristics | Adhesion force Before SRA | Adhesion force After SRA |
| Example 1 | ◉ | ◉ | ◉ | ○ |
| Example 2 | ○ | ◉ | ◉ | ○ |
| Example 3 | ◉ | ○ | r | r |
| Example 4 | ◉ | ◉ | ○ | r |
| Example 5 | ○ | ○ | ○ | r |
| Example 6 | r | ○ | ○ | r |
| Example 7 | ○ | ○ | ◉ | ○ |
| Example 8 | ◉ | ◉ | ◉ | r |
| Example 9 | ◉ | ◉ | ○ | r |
| Example 10 | ◉ | ◉ | ○ | r |
| Example 11 | ○ | ○ | ◉ | ○ |
| Example 12 | ◉ | ◉ | ◉ | r |
| Example 13 | ○ | ○ | ○ | r |
| Example 14 | ○ | ○ | ○ | r |
| Example 15 | r | ○ | r | r |
| Example 16 | r | ○ | r | r |
| Example 17 | ○ | ◉ | ○ | r |
| Example 18 | ○ | ◉ | ○ | r |
| Example 19 | ◉ | ◉ | ○ | r |
| Example 20 | ◉ | ○ | r | r |
| Example 21 | ◉ | ◉ | ◉ | ○ |
| Example 22 | ○ | ○ | ◉ | ○ |
| Example 23 | r | ○ | ○ | r |
| Example 24 | ○ | ○ | ◉ | ○ |
| Example 25 | ◉ | ◉ | ◉ | r |
| Comparative Example 1 | — | ◉ | ◉ | X |
| Comparative Example 2 | — | ◉ | ◉ | X |

[Note 3:
Evaluation Reference]
Very Excellent: ◉,
Excellent: ○,
Average: r,
Insufficient: X Referring to Table 3, Examples 1 to 25 using an organic/inorganic composite instead of an organic resin and a composite metal phosphate instead of a chromate or phosphate salt, unlike Comparative Examples 1 and 2, showed overall excellent solution stability and excellent surface characteristics (insulation property, etch resistance, and close contacting property), and were effectively prevented from having deterioration of an adhesion force before and after SRA. Particularly, when an epoxy-based or urethane-based resin was used as an organic resin of the organic/inorganic composite in Examples 1 to 25, excellent results were obtained in all the evaluations.

Regarding the adhesion force before and after SRA, the examples and comparative examples commonly showed that an adhesion force after the stress-relief annealing was relatively deteriorated compared with that before the stress-relief annealing. The reason is that the organic resin was decomposed during the stress-relief annealing at a high temperature, and thus an empty space was formed between the adhered non-oriented steel sheets. However, a reason that a particular adhesion force was still maintained after the stress-relief annealing is that the different non-oriented steel sheets had already been adhered to one another through the heat fusion and that an oxide layer was formed as a decomposition product of the organic resin.

Herein, as for Examples 1 to 25 using an organic/inorganic composite compared with Comparative Examples 1 and 2 using an organic resin, inorganic nanoparticles were overall densely and uniformly distributed in an adhesive coating layer through the medium of the organic resin as illustrated above, and accordingly, the insulation property and heat resistance were improved, and particularly, surface characteristics and adhesive properties even after SRA were effectively prevented from having deterioration.

Evaluation Example 2: Examination of Adhesive Coating Layer According to Example 1

The adhesion force before and after SRA of Example 1 was specifically evaluated.

Figure 2:
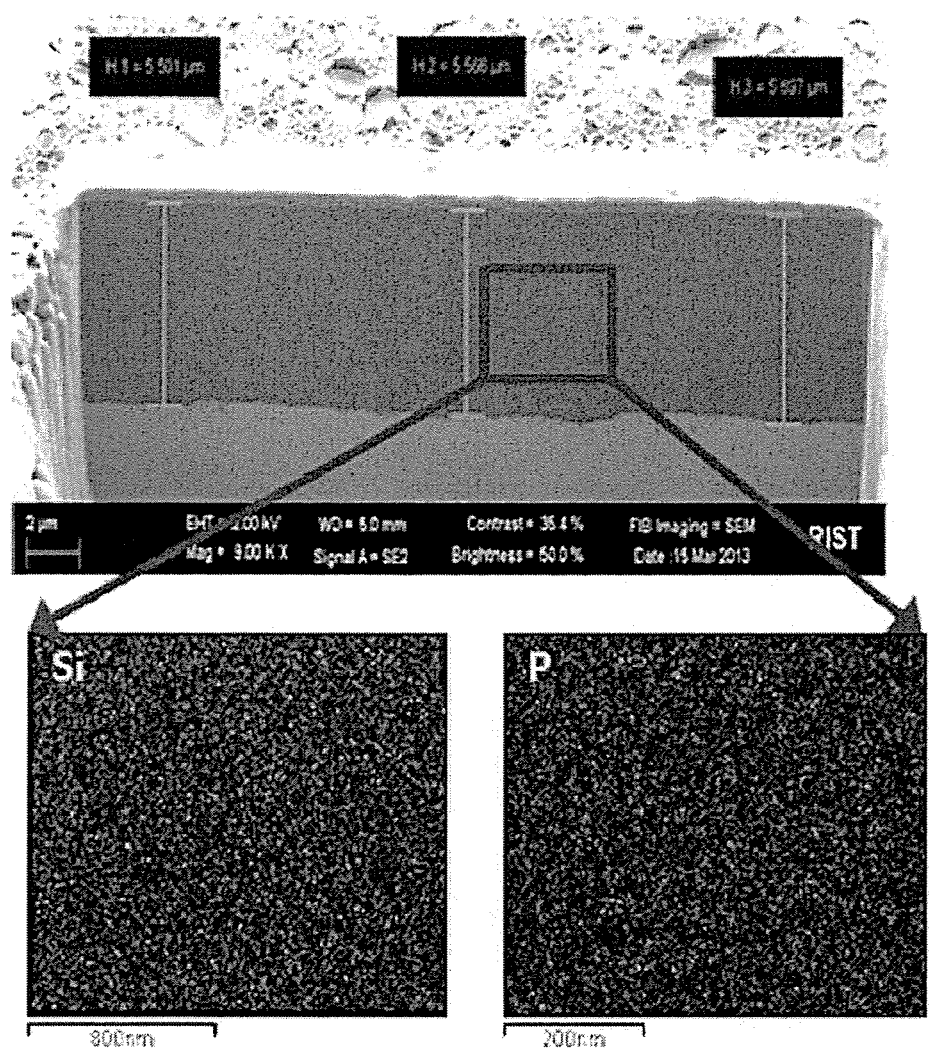
FIG. 2 is a transmission electron microscope (TEM) photograph showing a cross-section of a product coated with a composition (before heat fusion) and then treated with a FIB (focused ion beam) in Example 1.

First, FIG. 2 is a transmission electron microscope (TEM) photograph showing a cross-section of a coating layer obtained by coating the composition of Example 1 (before heat fusion) and processing it with an FIB (focused ion beam), which shows that inorganic nanoparticles (i.e., Si) and a composite metal phosphate (specifically, P) are uniformly distributed in the adhesive coating layer.

Figure 3:
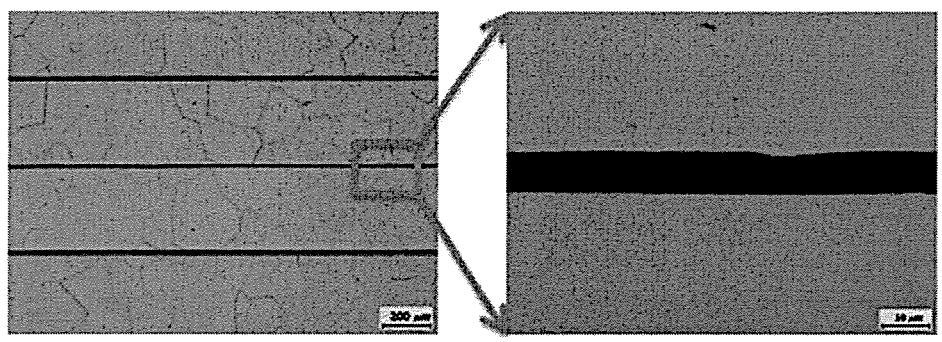
FIG. 3 is an optical microscope photograph (left) and a scanning electron microscope (SEM) photograph (right) of the product after the heat fusion (before SRA) in Example 1.

FIG. 3 is an optical microscope photograph (left) and a scanning electron microscope (SEM) photograph (right) of a product after the heat fusion (before SRA) in Example 1. The cross-section of the product after the heat fusion in Example 1 showed that each steel sheet was coalesced without an empty space.

Figure 4:
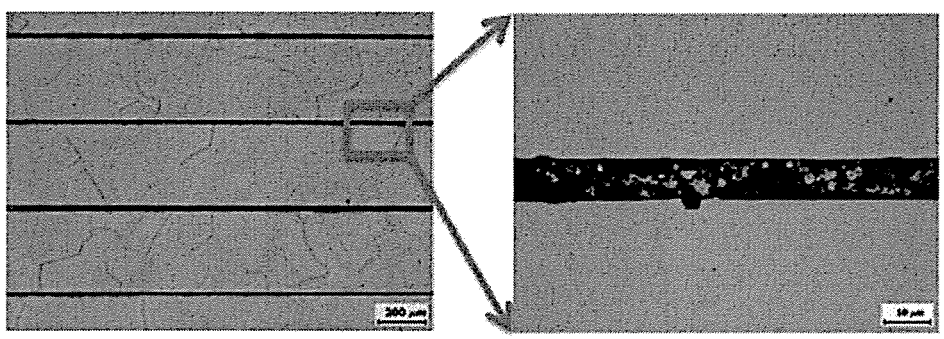
FIGS. 4 and 5 show an optical microscope photograph and a scanning electron microscope photograph of the product after SRA in Example 1.
Figure 5:
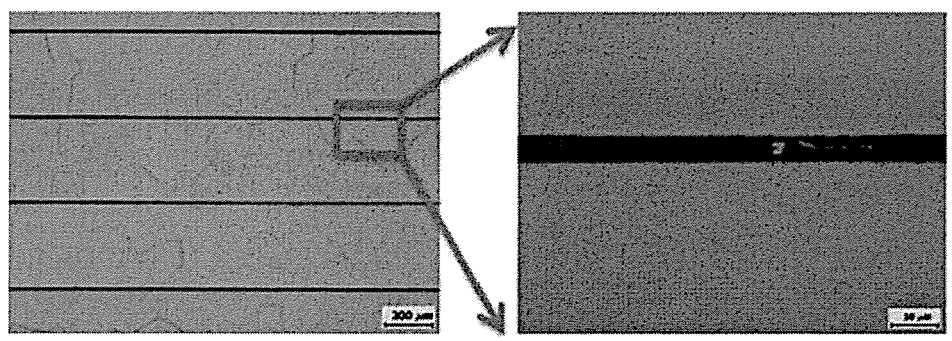

FIGS. 4 and 5 are respectively an optical microscope photograph and a scanning electron microscope showing a cross-section of the product after SRA in Example 1. The cross-section of the product after SRA in Example 1 shows that a resin in an adhesion solution was partly decomposed, and thus, an empty space between sheets was present.

However, as each steel sheet was coalesced without an empty space through heat fusion and then treated through SRA, permeation of gas during SRA was minimized, and thus an excellent adhesion force was still maintained. On the other hand, the adhesion force seemed to be more excellent under the nitrogen gas (FIG. 5) than under the modifying gas (FIG. 4) during SRA.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. A non-oriented electrical steel sheet adhesive coating composition, being
a composition comprising:
a first component including an organic/inorganic composite; and
a second component including a composite metal phosphate,
wherein the composition includes 80 to 97 wt % of the first component and 3 to 20 wt % of the second component based on a total amount, 100 wt %, of the composition,
the organic/inorganic composite is formed by having inorganic nanoparticles chemically substituted with some functional groups in an organic resin,
the organic resin is one, or two or more, selected from an epoxy-based resin, an ester-based resin, an acrylic resin, a styrene-based resin, a urethane-based resin, and an ethylene-based resin, and
the inorganic nanoparticles are one, or two or more, selected from $SiO_2$, $Al_2O_3$, $TiO_2$, MgO, ZnO, and $ZrO_2$.

2. The non-oriented electrical steel sheet adhesive coating composition of claim 1, wherein the second component is one composite metal phosphate or a mixture of two or more selected from aluminum phosphate monobasic ($Al(H_3PO_4)_3$), cobalt phosphate monobasic ($Co(H_3PO_4)_2$), calcium phosphate monobasic ($Ca(H_3PO_4)_2$), zinc phosphate monobasic ($Zn(H_3PO_4)_2$), and magnesium phosphate monobasic ($Mg(H_3PO_4)_2$).

3. The non-oriented electrical steel sheet adhesive coating composition of claim 2, wherein
the second component is a mixture selected from
a mixture of the aluminum phosphate monobasic ($Al(H_3PO_4)_3$) and the cobalt phosphate monobasic ($Co(H_3PO_4)_2$) in a weight ratio of 1:1,
a mixture of the cobalt phosphate monobasic ($Co(H_3PO_4)_2$) and the zinc phosphate monobasic ($Zn(H_3PO_4)_2$) in a weight ratio of 1:1,
a mixture of the aluminum phosphate monobasic ($Al(H_3PO_4)_3$) and the magnesium phosphate monobasic ($Mg(H_3PO_4)_2$) in a weight ratio of 1:1,
a mixture of the cobalt phosphate monobasic ($Co(H_3PO_4)_2$) and the calcium phosphate monobasic ($Co(H_3PO_4)_2$) in a weight ratio of 1:1,
a mixture of the calcium phosphate monobasic ($Ca(H_3PO_4)_2$) and the zinc phosphate monobasic ($Zn(H_3PO_4)_2$) in a weight ratio of 1:1,
a mixture of the aluminum phosphate monobasic ($Al(H_3PO_4)_3$), the cobalt phosphate monobasic ($Co(H_3PO_4)_2$), and the calcium phosphate monobasic ($Ca(H_3PO_4)_2$) in a weight ratio of 1:1:1, and
a mixture of the aluminum phosphate monobasic ($Al(H_3PO_4)_3$) the calcium phosphate monobasic ($Co(H_3PO_4)_2$), and the magnesium phosphate monobasic ($Mg(H_3PO_4)_2$) in a weight ratio of 1:1:1.

4. The non-oriented electrical steel sheet adhesive coating composition of claim 1, wherein
the first component is one organic/inorganic composite or a mixture of two or more selected from a $SiO_2$-epoxy composite, an $Al_2O_3$-epoxy composite, a $TiO_2$-epoxy composite, a $SiO_2$-ester composite, a ZnO-ester composite, a $SiO_2$-acrylic composite, an $Al_2O_3$-acrylic composite, a ZnO-acrylic composite, a $ZrO_2$-acrylic composite, a $SiO_2$-styrene composite, a $TiO_2$-styrene composite, a MgO-styrene composite, a $SiO_2$-urethane composite, an $Al_2O_3$-urethane composite, a ZnO-urethane composite, a $SiO_2$-ethylene composite, an $Al_2O_3$-ethylene composite, and a ZnO-ethylene composite.

5. The non-oriented electrical steel sheet adhesive coating composition of claim 4, wherein
the first component is a mixture selected from
a mixture of the $SiO_2$-epoxy composite and the $Al_2O_3$-epoxy composite in a weight ratio of 1:1,
a mixture of the $SiO_2$-epoxy composite and the $TiO_2$-epoxy composite in a weight ratio of 1:1,
a mixture of the $SiO_2$-ester composite and the ZnO-ester composite in a weight ratio of 1:1,
a mixture of the $SiO_2$-styrene composite and the MgO-styrene composite in a weight ratio of 1:1,
a mixture of the $SiO_2$-styrene composite and the $TiO_2$-styrene composite in a weight ratio of 1:1,
a mixture of the $Al_2O_3$-urethane composite and the ZnO-urethane composite in a weight ratio of 1:1, a mixture of the SiO$_2$-urethane composite and the ZnO-urethane composite in a weight ratio of 1:1,
a mixture of the SiO$_2$-ethylene composite and the Al$_2$O$_3$-ethylene composite in a weight ratio of 1:1,
a mixture of the SiO$_2$-ethylene composite and the ZnO-ethylene composite in a weight ratio of 1:1,
a mixture of the SiO$_2$-epoxy, the Al$_2$O$_3$-epoxy, and the TiO$_2$-epoxy composite in a weight ratio of 1:1:1,
a mixture of the SiO$_2$-acrylic composite, the Al$_2$O$_3$-acrylic composite, and the ZnO-acrylic composite in a weight ratio of 1:1:1,
a mixture of the SiO$_2$-styrene composite, the TiO$_2$-styrene composite, and the MgO-styrene composite in a weight ratio of 1:1:1,
a mixture of the SiO$_2$-urethane composite, the Al$_2$O$_3$-urethane composite, and the ZnO-urethane composite in a weight ratio of 1:1:1, and
a mixture of the SiO$_2$-ethylene composite, the Al$_2$O$_3$-ethylene composite, and the ZnO-ethylene composite in a weight ratio of 1:1:1.

6. The non-oriented electrical steel sheet adhesive coating composition of claim 1, wherein
the organic resin is included in an amount of 70 to 99.9 wt % based on 100 wt % of the first component, and
the inorganic nanoparticles are included in an amount of 0.1 to 30 parts by weight based on 100 parts by weight of a solid content of the organic resin.

7. The non-oriented electrical steel sheet adhesive coating composition of claim 1, wherein
a weight ratio of the inorganic nanoparticles relative to the metal phosphate is 0.1:1 to 20:1.

8. The non-oriented electrical steel sheet adhesive coating composition of claim 1, wherein
the organic resin has a weight average molecular weight of 1000 to 50,000.

9. The non-oriented electrical steel sheet adhesive coating composition of claim 1, wherein the organic resin has a softening point (Tg) of less than or equal to 200° C.

10. The non-oriented electrical steel sheet adhesive coating composition of claim 1, wherein
the inorganic nanoparticles have an average particle diameter of 3 to 30 nm.

11. A non-oriented electrical steel sheet product, comprising:
a plurality of non-oriented electrical steel sheets; and
an adhesive coating layer between the plurality of non-oriented electrical steel sheets,
wherein the adhesive coating layer includes a first component including an organic/inorganic composite and a second component including a composite metal phosphate,
the adhesive coating layer includes 80 to 97 wt % of the first component and 3 to 20 wt % of the second component based on a total amount, 100 wt %, of the adhesive coating layer,
the organic/inorganic composite is formed by having inorganic nanoparticles chemically substituted with some functional groups in an organic resin,
the organic resin is one, or two or more, selected from an epoxy-based resin, an ester-based resin, an acrylic resin, a styrene-based resin, a urethane-based resin, and an ethylene-based resin,
the inorganic nanoparticles are one, or two or more, selected from SiO$_2$, Al$_2$O$_3$, TiO$_2$, MgO, ZnO, and ZrO$_2$.

12. The non-oriented electrical steel sheet product of claim 11, wherein the inorganic nanoparticles may be distributed in 1 to 10 area % based on a total area, 100 area %, of the adhesive coating layer.

13. The non-oriented electrical steel sheet product of claim 11, wherein the adhesive coating layer has a thickness of 0.5 to 10 μm.

14. A method of manufacturing a non-oriented electrical steel sheet product, comprising:
preparing an adhesive coating composition;
adhering a plurality of non-oriented electrical steel sheets with the adhesive coating composition; and
stress-relief annealing (SRA) a plurality of non-oriented electrical steel sheets adhered thereto with the adhesive coating composition to obtain a non-oriented electrical steel sheet product,
wherein the adhesive coating composition includes a first component including an organic/inorganic composite and a second component including a composite metal phosphate,
the composition includes 80 to 97 wt % of the first component and 3 to 20 wt % of the second component based on a total amount, 100 wt %, of the composition,
the organic/inorganic composite is formed by having inorganic nanoparticles chemically substituted with some functional groups in an organic resin,
the organic resin is one, or two or more, selected from an epoxy-based resin, an ester-based resin, an acrylic resin, a styrene-based resin, a urethane-based resin, and an ethylene-based resin, and
the inorganic nanoparticles are one, or two or more, selected from SiO$_2$, Al$_2$O$_3$, TiO$_2$, MgO, ZnO, and ZrO$_2$.

15. The method of manufacturing a non-oriented electrical steel sheet product of claim 14, wherein
the adhering of a plurality of non-oriented electrical steel sheets with the adhesive coating composition includes:
applying the adhesive coating composition on one surface or both surfaces of the plurality of non-oriented electrical steel sheets;
curing the applied adhesive coating composition to form an adhesive coating layer; and
laminating another sheet of the plurality of non-oriented electrical steel sheets on the adhesive coating layer and performing heat fusion.

16. The method of manufacturing a non-oriented electrical steel sheet product of claim 14, wherein the stress-relief annealing (SRA) of a plurality of non-oriented electrical steel sheets adhered thereto with the adhesive coating composition to obtain a non-oriented electrical steel sheet product is performed in a temperature range of 500 to 900° C.

17. The method of manufacturing a non-oriented electrical steel sheet product of claim 14, wherein the stress-relief annealing (SRA) of a plurality of non-oriented electrical steel sheets adhered thereto with the adhesive coating composition to obtain a non-oriented electrical steel sheet product is performed for 60 to 180 minutes.

18. The method of manufacturing a non-oriented electrical steel sheet product of claim 14, wherein the stress-relief annealing (SRA) of a plurality of non-oriented electrical steel sheets adhered thereto with the adhesive coating composition to obtain a non-oriented electrical steel sheet product is performed under a mixed gas atmosphere of a modifying gas and nitrogen (N$_2$) gas.

19. The method of manufacturing a non-oriented electrical steel sheet product of claim 18, wherein the nitrogen gas is included at 90 volume % or greater (excluding 100 volume %) based on 100 volume % of the mixed gas.

20. The method of manufacturing a non-oriented electrical steel sheet product of claim 18, wherein a volume ratio of air relative to LNG is 5:1 to 10:1.

\* \* \* \* \*